United States Patent
Cheenath et al.

(10) Patent No.: US 11,250,025 B2
(45) Date of Patent: Feb. 15, 2022

(54) METHODS AND SYSTEMS FOR BULK UPLOADING OF DATA IN AN ON-DEMAND SERVICE ENVIRONMENT

(71) Applicant: salesforce.com, inc., San Francisco, CA (US)

(72) Inventors: Manoj Cheenath, San Ramon, CA (US); Simon Z. Fell, Corte Madera, CA (US); Jesper Joergensen, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 98 days.

(21) Appl. No.: 16/286,359

(22) Filed: Feb. 26, 2019

(65) Prior Publication Data

US 2019/0205313 A1    Jul. 4, 2019

Related U.S. Application Data

(62) Division of application No. 14/630,567, filed on Feb. 24, 2015, now Pat. No. 10,216,821, which is a (Continued)

(51) Int. Cl.
  *G06F 16/27* (2019.01)
  *G06F 16/955* (2019.01)
  *G06F 16/23* (2019.01)

(52) U.S. Cl.
  CPC ........ *G06F 16/273* (2019.01); *G06F 16/2365* (2019.01); *G06F 16/2386* (2019.01); *G06F 16/955* (2019.01)

(58) Field of Classification Search
  None
  See application file for complete search history.

(56) References Cited

U.S. PATENT DOCUMENTS 3,725,864 A * 4/1973 Clark .................. G06F 13/122
  710/6
4,325,120 A * 4/1982 Colley .................. G06F 9/546
  711/202

(Continued)

OTHER PUBLICATIONS

Final Office Action for U.S. Appl. No. 12/973,687, dated Feb. 15, 2013, 17 pages.

(Continued)

*Primary Examiner* — Mark D Featherstone
*Assistant Examiner* — Navneet Gmahl
(74) *Attorney, Agent, or Firm* — Elliot, Ostrander & Preston, P.C.

(57) ABSTRACT

Methods and systems for bulk uploading of data in an on-demand service environment are described. In one embodiment, such a method includes retrieving a bulk transaction request from a transaction queue within a host organization, where the bulk transaction request specifies a plurality of database transactions to be processed against a multi-tenant database system of the host organization. Such a method further includes determining a current computational load of the multi-tenant database system, processing a subset of the plurality of database transactions specified by the bulk transaction request against the multi-tenant database system when the current computational load is below a threshold, and updating a bulk transaction results log based on the subset of the plurality of database transactions processed. Remaining database transactions specified by the bulk transaction request may then be re-queued for later processing.

21 Claims, 5 Drawing Sheets

Related U.S. Application Data division of application No. 12/973,687, filed on Dec. 20, 2010, now Pat. No. 8,965,860.

(60) Provisional application No. 61/320,189, filed on Apr. 1, 2010.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,496,580 B1* | 12/2002 | Chack | H04M 3/523 379/265.02 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 7,949,817 B1* | 5/2011 | Sakarda | G06F 1/3253 710/307 |
| 8,965,860 B2* | 2/2015 | Cheenath | G06F 16/273 707/703 |
| 9,917,885 B2* | 3/2018 | Campbell | G06F 11/3082 |
| 10,216,821 B2* | 2/2019 | Cheenath | G06F 16/273 |
| 2001/0039548 A1* | 11/2001 | Shinkai | G06F 16/182 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0152305 A1* | 10/2002 | Jackson | H04L 41/509 709/224 |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0194251 A1* | 12/2002 | Richter | G06F 9/5011 718/105 |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189573 A1* | 10/2003 | Dahlen | G06F 13/385 345/522 |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Leon et al. | |
| 2004/0199543 A1 | 10/2004 | Braud et al. | |
| 2004/0205312 A1* | 10/2004 | Zlotnick | G06F 11/2071 711/162 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0038795 A1* | 2/2005 | Chariot | G06F 9/546 |
| 2005/0050555 A1 | 3/2005 | Exley et al. | |
| 2005/0091098 A1 | 4/2005 | Brodersen et al. | |
| 2007/0067313 A1* | 3/2007 | Garza | G06F 9/546 |
| 2008/0082586 A1* | 4/2008 | Jasik | H04L 51/22 |
| 2008/0177678 A1* | 7/2008 | Di Martini | G06Q 10/04 705/412 |
| 2009/0006647 A1* | 1/2009 | Balonado | H04L 45/02 709/238 |
| 2009/0138890 A1* | 5/2009 | Blake | G06F 9/30087 718/106 |
| 2009/0177658 A1* | 7/2009 | Brantner | G06F 16/2477 |

(56) References Cited

U.S. PATENT DOCUMENTS

| | | | |
|---|---|---|---|
| 2009/0240892 A1* | 9/2009 | Moyer | G06F 12/0831 |
| | | | 711/146 |
| 2010/0153605 A1* | 6/2010 | Rogers | G06F 13/24 |
| | | | 710/267 |
| 2010/0169522 A1* | 7/2010 | Fleming | G06F 13/385 |
| | | | 710/100 |
| 2010/0332617 A1* | 12/2010 | Goodwin | G06F 9/455 |
| | | | 709/219 |
| 2011/0131448 A1* | 6/2011 | Vasil | G06F 9/5038 |
| | | | 714/19 |
| 2012/0185913 A1* | 7/2012 | Martinez | G06F 9/45558 |
| | | | 726/1 |

OTHER PUBLICATIONS

Notice of Allowance for U.S. Appl. No. 12/973,687, dated Oct. 8, 2014, 21 pages.
Notice of Allowance for U.S. Appl. No. 14/630,567, dated Oct. 12, 2018, 10 pages.
Office Action for U.S. Appl. No. 12/973,687, dated Aug. 2, 2012, 16 pages.
Office Action for U.S. Appl. No. 14/630,567, dated Apr. 5, 2018, 19 pages.

* cited by examiner

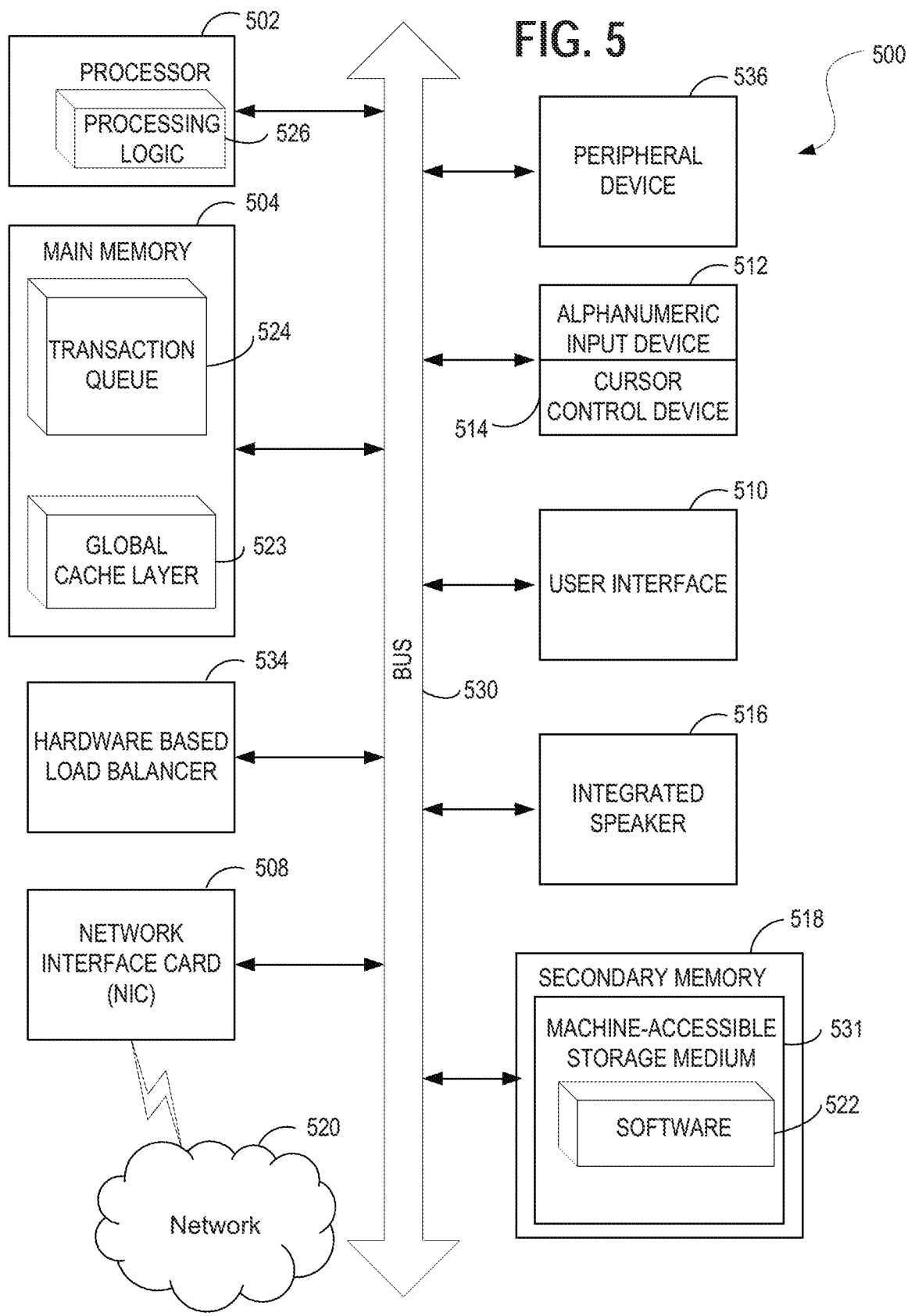

METHODS AND SYSTEMS FOR BULK UPLOADING OF DATA IN AN ON-DEMAND SERVICE ENVIRONMENT

CLAIM OF PRIORITY

This application is a divisional of the utility application entitled "METHODS AND SYSTEMS FOR BULK UPLOADING OF DATA IN AN ON-DEMAND SERVICE ENVIRONMENT," filed on Feb. 24, 2015, having an application number of Ser. No. 14/630,567, which is a divisional application of, and claims priority to, the utility application entitled "METHODS AND SYSTEMS FOR BULK UPLOADING OF DATA IN AN ON-DEMAND SERVICE ENVIRONMENT," filed on Dec. 20, 2010, having an application number of Ser. No. 12/973,687; and the provisional utility application entitled "METHODS AND SYSTEMS FOR BULK UPLOADING OF DATA IN AN ON-DEMAND SERVICE ENVIRONMENT," filed on Apr. 1, 2010, having an application number of 61/320,189, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to methods and systems for bulk uploading of data in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In a conventional client/server transaction a client computing device submits a request to a server, the server processes the request, and then returns a result to the client, thus completing the transaction cycle. While such a model works well for simple transactions that process quickly, the above model does not scale well to transactions that require longer durations to process. One problem is that a client device awaiting a response from a server may appear to have "hung" or "crashed" while awaiting the response, or may simply time out, before a response is received, thus having wasted the period of time awaiting a server response, and potentially having caused a server to waste resources developing a response that is never received by the client.

Although a result from the server may eventually be forthcoming, a client experiencing a perceived delay may terminate prematurely and potentially re-submit the request, causing duplicative effort on the part of the server and potentially introducing transactional errors, such as having the server implement the same request multiple times.

Such a problem is exacerbated where a client device is attempting to upload a large amount of data to a database or initiate a large number of transactions with a database. Undesirable data inconsistencies may occur where a client terminates prematurely or times out without having received a response from the server, especially where the client then re-submits the same request.

The present state of the art may therefore benefit from the methods and systems for bulk uploading of data in an on-demand service environment as described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 5 illustrates a diagrammatic representation of a machine in the exemplary form of a computer system, in accordance with one embodiment.

DETAILED DESCRIPTION

Figure 1:
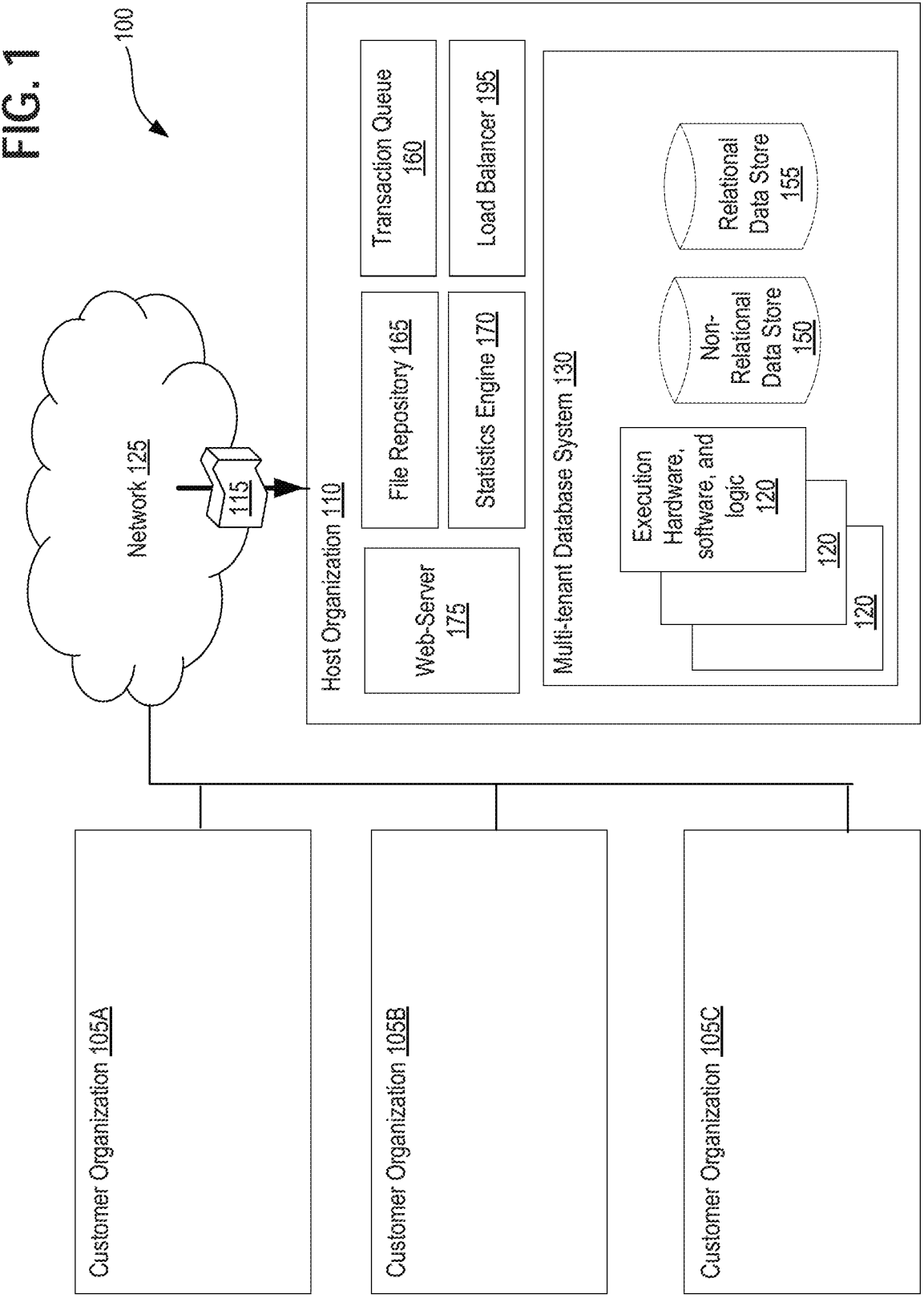
FIG. 1 illustrates an exemplary architecture in which embodiments may operate.

Described herein are systems, devices, and methods for bulk uploading of data in an on-demand service environment. In one embodiment, such a method includes retrieving a bulk transaction request from a transaction queue within a host organization, where the bulk transaction request specifies a plurality of database transactions to be processed against a multi-tenant database system of the host organization. Such a method further includes determining a current computational load of the multi-tenant database system, processing a subset of the plurality of database transactions specified by the bulk transaction request against the multi-tenant database system when the current computational load is below a threshold, and updating a bulk transaction results log based on the subset of the plurality of database transactions processed. Remaining database transactions specified by the bulk transaction request may then be re-queued for later processing.

For example, in an on-demand service environment, such as a "cloud computing" environment where a host organization provides computing resources and services to customer organizations, customer organizations may transact with the host organization by way of a client request and a server response cycle. In such a cycle, the client sends a request, and awaits a response from the server before proceeding to another task. For example, the client may submit a database transaction, such as a record add, a record retrieval, a record update, a record search, and so forth, and simply await the response from the server. This type of transaction cycle, where the client device awaits a response from the server is sometimes referred to as synchronous processing.

However, customer organizations utilizing such services may find it necessary to upload large amounts of data to the host organization, thus making the synchronous client/server request/response model undesirable.

Take for example a customer organization needing to upload a large number of records (e.g., thousands, tens of thousands, or hundreds of thousands of records, etc.) to a database provided by the host organization. Such a need may arise where a customer organization is migrating their locally implemented database to the cloud (e.g., to the on-demand service provided by the host organization); where the customer organization is uploading locally transacted but non-synced records to the on-demand service for the purposes of creating a live backup resource in the cloud (e.g., via the host organization) for redundancy or for overflow processing, etc.

Various problems arise where a customer organization attempts to submit all the data associated with a large request as a single request when using synchronous processing. For example, such a request may exceed an allowable transfer data limit inherent to an http (hyper text transfer protocol) "post" based data transfer; such a request may exceed an allowable time period for an http session; such a request may require server processing time that exceeds a time-out period of the client and so forth.

Additionally, where a host organization provides parallel processing so that transactions are fulfilled more quickly, there is a potential for a single customer organization to submit a large request that, when parallelized by the host organization, consumes an inordinate amount of resources within the host organization, thus causing delays and detrimental effects for other customer organizations utilizing the same on-demand services.

Utilizing the systems and methods described herein, bulk transaction requests received from customer organizations may be received in a format that is convenient for the customer organizations and processed asynchronously, in a manner that best utilizes the available computational resources of the host organization, without detrimentally affecting other users of the same on-demand services provided by the host organization. With asynchronous processing, the client submits an asynchronous request, such as a bulk transaction request.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a computer readable storage medium having instructions stored thereon, causes one or more processors within an on-demand service environment implementing a multi-tenant database system to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Architecture 100 depicts a host organization 110 communicably interfaced with several customer organizations (105A, 105B, and 105C) via network 125. Within the host organization 110 is a web-server 175, file repository 165, transaction queue 160, statistics engine 170, load balancer 195, and a multi-tenant database system 130 having a plurality of underlying hardware, software, and logic elements 120 therein that implement database functionality and a code execution environment within the host organization 110. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services or cloud computing services to subscribing customer organizations 105A-C.

In one embodiment, each of the separate and distinct customer organizations (105A-105C) may be remotely located from the host organization 110 that provides on-demand services to the customer organizations (105A-105C) via multi-tenant database system 130 executing therein. Alternatively, one or more of the customer organizations 105A-105C may be co-located with the host organization 110, such as within the same organization that hosts and provides the multi-tenant database system 130 upon which underlying data is persistently stored, such as data provided within a bulk transaction request 115 from a customer organization 105A-C. Where the customer organizations 105A-C are remote, host organization 110 provides remotely implemented cloud computing services.

In one embodiment, the hardware, software, and logic elements 120 of the multi-tenant database system 130 include at least a non-relational data store 150 and a relational data store 155, which operate in accordance with the hardware, software, and logic elements 120 that implement the database functionality and code execution environment within the host organization 110.

In one embodiment, host organization 110 retrieves a bulk transaction request 115 from a transaction queue 160. In such an embodiment, the bulk transaction request 115 specifies a plurality of database transactions to be processed against the multi-tenant database system 130 of the host organization 110. In such an embodiment, host organization 110 further determines a current computational load of the multi-tenant database system and processes a subset of the plurality of database transactions specified by the bulk transaction request 115 against the multi-tenant database system 130 when the current computational load is below a threshold. A bulk transaction results log is then updated based on the subset of the plurality of database transactions processed.

Host organization 110 may receive a variety of requests, including bulk transaction requests 115 for asynchronous processing from one or more of the plurality of customer organizations 105A-105C via the network 125. Incoming requests may be received at web-server 175 and may specify a requests for services from the host organization 110, such as a real-time transaction request for synchronous processing to retrieve or store data on behalf of one of the customer organizations 105A-C or bulk transaction requests 115 specifying multiple database transactions. For example, web-server 175 may be responsible for receiving bulk transaction requests 115 from various customer organizations 105A-C via network 125 and provide a web-based interface to an end-user client machine originating the bulk transaction request 115.

In one embodiment, the bulk transaction request 115 is received at the host organization and stored in a file repository 165. The file repository 165 may be a datastore separate from the multi-tenant database system 130 configured specially for storing the received bulk transaction requests 115, such as a file system operating in conjunction with web-server 175. Alternatively, host organization 110 may store the received bulk transaction request 115 in the multi-tenant database system 130 for later retrieval or within another location designated as a landing site for data associated with incoming requests.

Received bulk transaction requests 115 are queued for processing. In one embodiment, host organization 110 inserts the bulk transaction request 115 into transaction queue 160. The bulk transaction request 115 may be inserted into the transaction queue 160 among a plurality of bulk transaction requests and a plurality of real-time transaction requests in the transaction queue 160. Transaction queue 160 may maintain a link, pointer, or reference to the data associated with the bulk transaction request 115 (e.g., a link pointing to corresponding data stored within file repository 165) rather than hosting the contents bulk transaction request 115 directly. Alternatively, the plurality of database transactions specified by a bulk transaction request 115 may be loaded into the transaction queue 160 as a bulk transaction request 115.

In accordance with one embodiment, a plurality of real-time transaction requests for synchronous processing within the transaction queue 160 are assigned a higher priority than the plurality of bulk transaction requests 115 for asynchronous processing. In such an embodiment, the real-time transaction requests are selected for processing against the multi-tenant database system 130 based on the higher priority. Correspondingly, in one embodiment, the plurality of bulk transaction requests 115 in the transaction queue 160 are assigned a lower priority than the plurality of real-time transaction requests, and are selected for processing against the multi-tenant database system 130 based on the lower priority. In accordance with disclosed embodiments, the bulk transaction requests 115 are additionally selected and scheduled for processing based on determined current computational load of the multi-tenant database system 130, in addition to their designation as lower priority tasks.

For example, in one embodiment, real-time transaction requests are designated as higher priority compared to bulk transaction requests 115 as a matter of policy. Real-time transaction requests may be those transactions received by the host organization 110 for processing which adhere to a client/server request/response model in which a client device (e.g., within customer organization 105A-C) submits a request and awaits a response from the host organization 110. Such policy or prioritization schemes may be implemented by, for example, a load balancer 195 working in conjunction with transaction queue 160 to distribute work to the multi-tenant database system 130. Alternatively, transaction queue 160 may implement the prioritization scheme and send work to the load balancer 195 in an order determined by the transaction queue 160.

In accordance with prioritized processing schemes, in one embodiment the host organization 110 receives a real-time transaction request subsequent to having received a bulk transaction request 115. In such an embodiment, despite the bulk transaction request 115 having been received first, the host organization processes the real-time transaction request against the multi-tenant database system before processing any part of the bulk transaction request 115 based on the higher priority of the real-time transaction request. In such an embodiment, the host organization 110 sends a response to a client device having submitted the real-time transaction request (e.g., a requestor having originated the real-time transaction request from one of the customer organizations 105A-C). In such an embodiment, the response specifies a result for the real-time transaction request and further indicates processing of the real-time transaction request is completed. This out of order processing may be appropriate so as to apply the available computational resources to the work load that most directly affects a perceived quality of service on behalf of the customer organizations 105A-C and/or an actual average response time for processing service requests from customer organizations 105A-C which are submitted with the expectation of real-time (e.g., synchronous, instantaneous or immediate) processing.

In one embodiment, sending a response to a client device having submitted the bulk transaction request 115 includes sending a response specifying a session identifier assigned to the bulk transaction request, and further acknowledging the bulk transaction request is queued for processing or queued for asynchronous processing. For example, although host organization 110 may respond to a client having submitted a bulk transaction request 115, such a response does not indicate that the bulk transaction request 115 has completed, but instead, provides an indication of successful receipt of such a request, and provides information to the client device which enables the customer organization 105A-C to check for appropriate status at a later time or to retrieve a bulk transaction results log describing the results of the plurality of database transactions incorporated within the bulk transaction request 115.

In one embodiment, the host organization validates the bulk transaction request 115 against one or more specifications. For example, validating the bulk transaction request 115 may include a) verifying the bulk transaction request 115 complies with a maximum record count threshold; b) verifying the bulk transaction request 115 complies with a maximum size threshold; and/or c) verifying the bulk transaction request 115 complies with an accepted request format. In such an embodiment, the bulk transaction request 115 is submitted to the transaction queue 160 once the bulk transaction request is successfully validated. For example, logic within the web-server 175 or transaction queue 160 may apply such a validation scheme to incoming bulk transaction requests.

The one or more specifications or requirements applied against incoming bulk transaction requests 115 may be based on policy, system performance, or system limitations. For example, where such requests are submitted over http, there are size limitations which are inherent to http post based transactions, and thus, limit the overall size that may be accommodated for any given request presented to the host organization. Accordingly, the host organization (e.g., via web-server 175) may reject bulk transaction requests 115 in excess of a specified size, such as 10 megabytes. Accepted formats may similarly be specified. For example, the host organization 110 may specify that it will reject any bulk transaction request 115 that is not presented in one of several enumerated formats, such as an XML (eXtended Markup Language) based flat file, a CSV (Comma Separated Values) based flat file, a specified object type, and so forth. Additionally, the host organization 110 may specify a maximum number of records or a maximum number of database transactions that are acceptable within a bulk transaction request 115. For example, the host organization may specify a 10,000 record or transaction limit per bulk transaction request 115, or a 20,000 or 30,000 limitation based on policy, system performance, or other considerations.

In some embodiments, one set of specifications are applied to bulk transaction requests 115 received at web-server 175 via http transfer protocol, while a different set of specifications is applied to bulk transaction requests 115 received via alternative transfer protocols (e.g., via a File Transfer Protocol (FTP), etc.).

In some embodiments, validation is performed via host organization 110 while in alternative embodiments, validation of bulk transaction requests 115 is performed via a client device at the requesting/submitting customer organization 105A-C, for example, via logic downloaded locally to the client from the host organization or via a client side interface of a customer organization 105A-C linking to corresponding API (Application Programming Interface) logic at the host organization 110.

In accordance with one embodiment, the bulk transaction request 115 is a bulk record upload request in which each of the plurality of individual database transactions specified by the bulk transaction request includes a record and/or row to be uploaded to a table in the multi-tenant database system. For example, the entire bulk transaction request 115 may constitute a large data upload or a data dump from a customer organization 105A-C to the host organization's 110 multi-tenant database system 130 in which all of the database transactions specified by the bulk transaction request 115 are record adds or record inserts, each individual database transaction specifying all the requisite data fields required to populate one row within a table.

Alternatively, each of the plurality of database transactions specified by the bulk transaction request 115 may include a database transaction of varying types. For example, allowable transaction types may include adds, updates, or deletes. Processing numerous updates and/or deletes may require processing times that more appropriate for a bulk transaction request 115 rather than a real-time processing request. Deletes and/or updates may be simple, for example, specifying a table and a primary key to transact against, or may be more complex, for example, specifying a "WHERE" clause to select an appropriate record or appropriate records to transact against, potentially requiring more time consuming full table scans or corresponding references to index tables and associated non-indexed tables to complete a delete or an update.

In one embodiment, the bulk transaction request 115 specifies a) a named table within the multi-tenant database system 130 against which to process the respective database transaction based on the transaction type and b) provides or specifies transaction data to be added, updated, or selected for deletion based on the transaction type during the respective database transaction.

Figure 2:
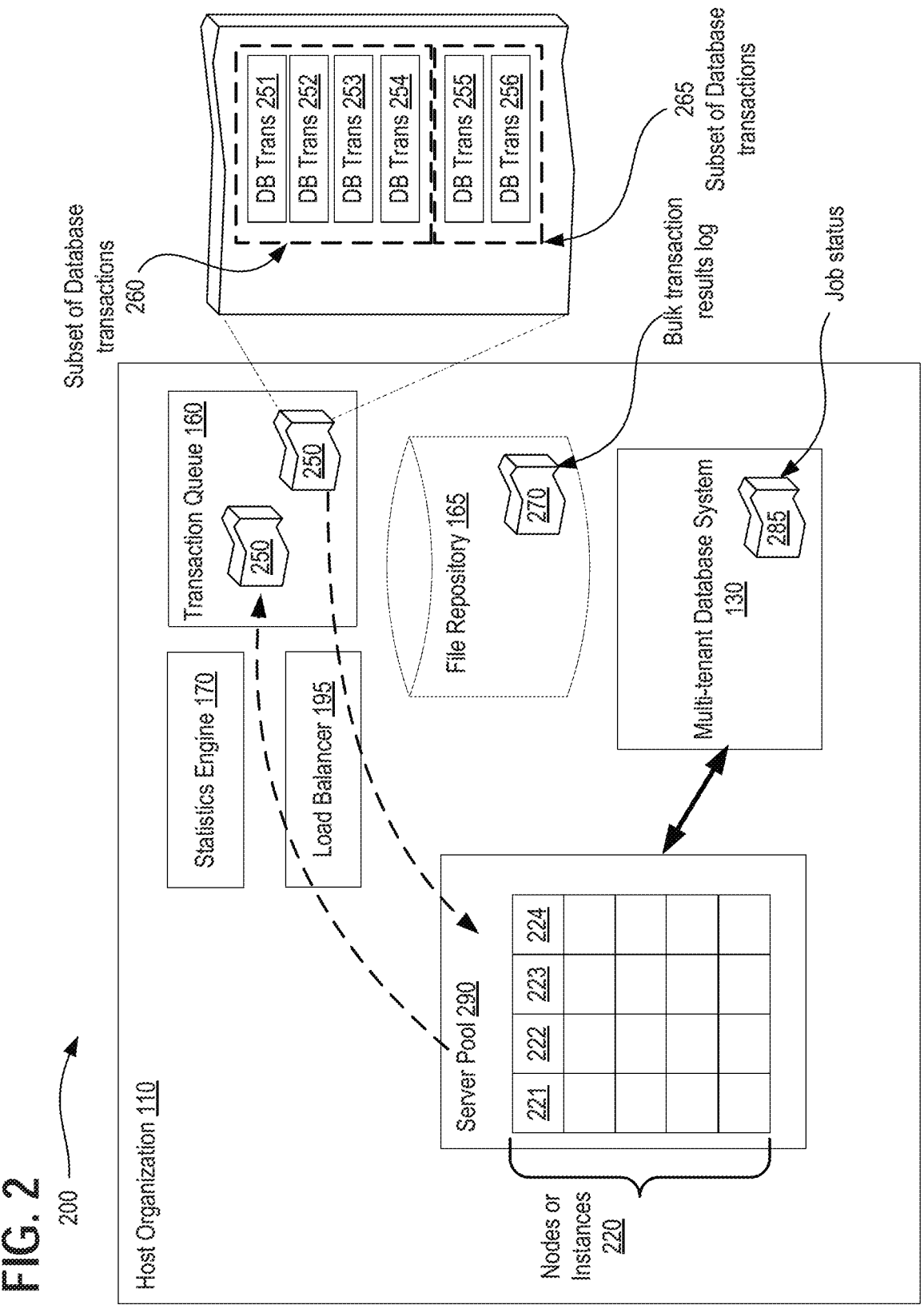
FIG. 2 illustrates an alternative exemplary architecture in which embodiments may operate.

FIG. 2 illustrates an alternative exemplary architecture 200 in which embodiments may operate.

In accordance with the described embodiments, work associated with bulk transaction requests 250 is applied, processed, or transacted against the multi-tenant database system 130 based, at least in part, on the current computational load of the multi-tenant database system 130.

Taking the current computational load of the multi-tenant database system into account may permit improved overall system performance and increased flexibility to the host organization 110. For example, the operators of host organization 110 implementing the on-demand services may be sensitive to how subscribers, such as customer organizations 105A-C, perceive the quality and capabilities of the on-demand services provided. Customer organizations may assess the quality and capabilities of the on-demand services is based on system responsiveness (e.g., response time or delay associated with processing a request for services and receiving a result) and also convenience. Some requests, such as a simple data search or data retrieval may be submitted by an end-user via a client side interface in which the end-user awaits a corresponding result/response from the host organization 110. In such a scenario, a long delay may be interpreted as poor service quality.

Conversely, bulk transaction requests 250 may be submitted as part of a large data upload or data transfer. In such a scenario, an end-user responsible for such a request may value the convenience of submitting and managing such a request over any subjective assessment of how long such a request should take. For example, a database administrator coordinating a large data upload may place a great value on the ability to upload a bulk of database transactions rather than having to develop a systematic process for uploading many thousands or even millions of individual records to the multi-tenant database system 130 as individual database add transactions.

The ability to schedule work, such as the many database transactions specified in a bulk transaction request 250, based on current system performance and current computational load may therefore enable the host organization to emphasize processing resources for time sensitive transactions (e.g., real-time transaction requests) while accommodating the convenience of submitting other transactions in bulk. Scheduling work in such a way may further enable the host organization to negate potentially negative effects associated with receiving bulk transactions. For example, immediately processing a bulk transaction request 250 when the multi-tenant database system 130 is operating at high computational loads may cause all transactions, including time sensitive real-time transaction requests, to experience unacceptable delay, thus deteriorating perceived quality levels on the part of customer organizations 105A-C.

Therefore, in accordance with described embodiments, determining a current computational load of the multi-tenant database system 130 includes retrieving one or more operational statistics from the multi-tenant database system 130 upon which to make an assessment. For example, determining the current computational load may be performed by the statistics engine 170 or by a load balancer 195 operating within the host organization 110. Similarly, the host organization 110 may compute operational loads on an ongoing basis and store appropriate information so that current operational loads may be retrieved as needed, for example, by the transaction queue 160 or by a load balancer 195 seeking to schedule work.

In accordance with one embodiment, the one or more operational statistics upon which a current operational load is determined includes: operating statistics describing Input/Output utilization of the multi-tenant database system 130; CPU utilization of the multi-tenant database system; number of free server nodes 220 available for processing database transactions within a pool of server nodes 290; number of active threads currently processing database transactions against the multi-tenant database system; current queue time of real-time database transactions to be processed against the multi-tenant database system; and number of queued real-time database transactions to be processed against the multi-tenant database system.

The host organization 110 may consider any number of operational statistics in determining a current operational load for the multi-tenant database system 130. The determined current operational load may result in a binary result, such as "available" for processing bulk transaction requests 250 or "not available" for processing bulk transaction requests 250, or may result in a numeric or percentage based value. For example, where all nodes 220 within the server pool 290 are in a non-idle state or have at least one active work thread assigned to them, the host organization may determine the current computational load to be "not available" for processing bulk transaction requests. Accordingly, such requests pending in the transaction queue 160 will be delayed or simply not scheduled for processing at that time.

Alternatively, a current computational load may be calculated to be, for example, 60% or 40%, etc., based on CPU utilization rates, I/O usage as a percentage of operational maximums, and so forth. Such data may be collected and analyzed by, for example, statistics engine 170 which then provides the current operational load based on its analysis.

Accordingly, in one embodiment, processing the subset of the plurality of database transactions when the current computational load is below the threshold includes determining computational resources are available for processing bulk transaction requests 250 based on a comparison of the one or more operational statistics against a corresponding one or more operational thresholds.

For example, FIG. 2 depicts a bulk transaction request 250 having been queued in transaction queue 160. The queued bulk transaction request specifies multiple database transactions 251-256. As shown, database transactions 251, 252, 253, and 254 are associated with a first subset of database transactions 260 specified by the bulk transaction request 250 and database transactions 255 and 256 are remaining or second subset of database transactions 265 of the queued bulk transaction request 250.

Responsive to a determination that current computational load is below a specified threshold, the host organization 110 (e.g., via load balancer 195) retrieves a queued bulk transaction request 250 from the transaction queue 160 for processing. For example, load balancer 195 may call a queue handler which is responsible for selecting queued items from the transaction queue 160. Such a queue handler may be implemented via, for example, within an Oracle™ compatible transaction queue or other queuing mechanism capable of working in conjunction with a load balancer 195. The load balancer may additionally specify a type of job, such as specifying that a bulk transaction request 250 is to be retrieved from the transaction queue 160 based on a determination that the current computational load is below an appropriate threshold. Alternatively, the load balancer 195 may request a queued transaction which by default will retrieve any queued real-time transaction, and specify that a bulk transaction request 250 is only to be returned when a) there no queued real-time transaction requests and b) current computational load is below a specified threshold (e.g., below 60% load for example).

In one embodiment, a queue handler returns a reference pointer to the plurality of individual database transactions (e.g., 251-256) associated with a queued bulk transaction request 250. In alternative embodiments, the queue handler returns a requested number of database transactions (251-256) associated with a queued bulk transaction request 250. In other embodiments, the queue handler returns a subset of database transactions (e.g., 260 or 265) to the load balancer 195.

In accordance with one embodiment, processing a subset of the plurality of database transactions (e.g., subset 260 or subset 265) against the multi-tenant database system 130 includes processing the plurality of database transactions 251-256 for a pre-determined period of time. For example, load balancer 195 may issue as many of the database transactions corresponding to a bulk transaction request as are able to be processed during a specified period of time (e.g., five seconds, five minutes, etc.). For example, the load balancer 195 may issue individual database transactions 251-256 to a single server node 220 one after another in serial fashion, or may issue database transactions 251-256 to multiple server nodes 220 within the pool of server nodes 290. Alternatively, the host organization may provide multiple database transactions 251-256 to a particular server node 220 directing the server node 220 to process for the specified period of time and then respond indicating which database transactions were processed (e.g., subset 260 may be specified or marked as having been processed) and which database transactions remain as unprocessed (e.g., subset 265 may remain as being unprocessed).

In an alternative embodiment, the load balancer 195 allocates a pre-determined number of the plurality of database transactions for processing. For example, the load balancer 195 selects subset 260 based on a pre-determined number of transactions to be issued and assigns the subset of database transactions 260 to a server node 220 which then processes all of the subset of database transactions 260 without regard to processing time. While the subsets of database transactions depicted is small (e.g., four such transactions in subset 260 and two such transactions in subset 265), the number of transactions selected and issued for processing may be orders of magnitude larger in practice. For example, the multi-tenant database system 130 hosts data associated with multiple distinct customer organizations 105A-C and thus, has processing capacity to deal with peak loads. In non-peak times, that capacity may be applied against bulk transaction requests 250 in which case many database transactions (e.g., thousands or tens of thousands) may be processed quickly and efficiently by leveraging excess capacity without detrimentally affecting time-sensitive transactions occurring in parallel (including time-sensitive real-time transactions that are requested during non-peak periods). During peak load periods, it may be not be feasible to conduct any processing of asynchronous type bulk transaction requests 250 as all available resources (determined based on current computational load) are being applied to other work.

In such embodiments where less than all database transactions associated with a bulk transaction request 250 are processed (e.g., subset 260 completes leaving subset 265 as unprocessed), the host organization re-queues the bulk transaction request 250 in the transaction queue 160. The re-queued bulk transaction request 250 thus has a subset (e.g., 260) of the plurality of database transactions 251-256 processed and further has a remaining portion/subset (e.g., 265) of the plurality of database transactions 251-256 unprocessed. For example, the curved dashed arrows of FIG. 2 depict a bulk transaction request being retrieved from the transaction queue 160, being partially processed against the multi-tenant database system 130 via the server pool 290, and subsequently re-queued in the transaction queue 160 as requiring further processing.

In accordance with described embodiments, the host organization 110 updates a bulk transaction results log 270 based on the subset of the plurality of database transactions (e.g., 260 or 265) processed. The bulk transaction results log 270 may be stored in file repository 165 or hosted within the multi-tenant database system 130. In accordance with one embodiment, the updated bulk transaction results log 270 includes a transaction result for each of the subset of database transactions (e.g., 260 or 265) processed. For example, each database transaction processed may be written to the bulk transaction results log 270 along with a completion code (e.g., pass/fail or "0" for a pass and a non-zero code indicating a failure mode, etc.).

In accordance with one embodiment, the contents of the updated bulk transaction results log 270 are transmitted to a customer organization (e.g., one of 105A-C) responsive to a request soliciting the bulk transaction results log 270. For example, an end-user may retrieve the log in the process of monitoring the progress of the bulk transaction request 250 or the end-user may retrieve the log to perform error analysis on any database transactions 251-256 that triggered a failure or error code (e.g., due to malformed data, improper data type, null values, incorrect query syntax, etc.).

In accordance with one embodiment, host organization 110 issues a job status 285 for the bulk transaction request 250. For example, job status 285 may be updated and/or issued each time a portion or a subset of the database transactions (260 or 265) are processed. Job status 285 may provide summary type information rather than detailed and individualized transaction by transaction information, such as that which is included in the bulk transaction results log 270. For example, issuing a job status 285 for a corresponding bulk transaction request 250 may include indicating one or more of: completion status; queue status, percentage complete, number of records transacted, number of records successfully transacted, number of transaction errors; total aggregate queue time; total aggregate processing time; and estimated time to completion. Such job status 285 may be stored in multi-tenant database system 130 so that it is easily locatable and retrievable by the host organization 110 when requested. The job status 285 may alternatively be written to, for example, file repository 165 or cached within a global caching layer of the host organization for fast accessibility without having to query the multi-tenant database system 130.

In one embodiment job status information 285 is returned to a customer organization 105A-C responsive to a status request from the customer organization identifying a bulk transaction request 250 submitted previously. For example, because the customer organizations 105A-C submit the bulk transaction requests 250 and receive, for example, only an acknowledgement of successful receipt or perhaps an indication that the request is queued, the customer organization may subsequently submit a status request to the host organization 110 soliciting the latest job status information 285 regarding the previously submitted bulk transaction request 250.

The architecture 200 depicted enables host organization 110 to iteratively retrieve a bulk transaction request 250, process portions of the bulk transaction request (e.g., subset 260 or 265), re-queue the bulk transaction request 250, and then continuously loop through such a process until all database transactions specified by a bulk transaction request have been processed against the multi-tenant database system 130.

Thus, in accordance with one embodiment, the host organization 110 (e.g., via a load balancer 195) re-retrieves the bulk transaction request 250 from the transaction queue (e.g., as a second, third, forth iteration, etc.), re-determines the current computational load of the multi-tenant database system 130, processes a second subset of the plurality of database transactions (e.g., processes subset 265 where subset 260 was processed on a prior iteration and where the second subset 265 is non-overlapping with the first subset 260 of the plurality of database transactions) as specified by the bulk transaction request 250 by applying or transacting the second subset of database transactions against the multi-tenant database system 130 when the current computational load is below a threshold. Such subsequent iterations may further include a re-updating of the bulk transaction results log 270 based on the second subset 265 of the plurality of database transactions processed and issuing a job status 285 for the bulk transaction request 250 reflecting the latest or most up-to-date status information (e.g., updating or revising a previously issued job status 285 where necessary).

In accordance with one embodiment, so as to facilitate subsequent iterations and partial processing of bulk transaction requests 250 during any iteration cycle, the host organization marks each of the subset of the plurality of database transactions (e.g., each of database transactions 251-254 within subset 260 or database transactions 255-256 within subset 265) specified by the bulk transaction request 250 as processed. For example, as each individual database transaction 251-256 is processed, the transaction may be flagged to indicate whether it is processed or not. In an alternative embodiment, processed database transactions are removed from the bulk transaction request thus leaving only unprocessed transactions within the bulk transaction request.

In one embodiment, the bulk transaction request 250 is re-queued in the transaction queue 160 based on a determination that one or more database transactions specified by the bulk transaction request remain unprocessed. Alternatively, the host organization 110 finalizes the bulk transaction results log 270 based on a determination that all database transactions specified by the bulk transaction request 250 are processed. For example, all database transactions are either marked or flagged as processed or are deleted from the bulk transaction request 250, thus negating the need to re-queue the bulk transaction request 250 for subsequent iterative processing.

In some embodiments, the host organization 110 may automatically initiate an outgoing message to the requesting customer organization 105A-C associated with a completed bulk transaction request indicating that processing is complete. Alternatively, the host organization provides job status information 285 responsive to a status request.

Because multiple server nodes or instances 220 are present within the server pool 290, it may be advantageous to issue parts or subsets (e.g., 260 or 265) of a bulk transaction request in parallel for expedited processing based on an evaluation of current computational load. At other times, the current computational load may be such that it is more appropriate to issue parts or subsets (e.g., 260 or 265) of a bulk transaction request in serial. Both may be accommodated in a dynamic and flexible manner by having distinct trigger points or multiple trigger points by which the host organization 110 may programmatically determine to issue work associated with bulk transaction requests 250 aggressively using parallel processing or more conservatively using serial/sequential processing.

Thus, in accordance with one embodiment, processing the subset of the plurality of database transactions (e.g., 260 or 265) specified by the bulk transaction request 250 against the multi-tenant database system 130 when the current computational load is below the threshold includes selecting serial processing when the current computational load is below the threshold by a first margin, wherein serial processing comprises issuing the subset of database transactions to one server node within a pool of server nodes for processing. For example, if a specified threshold at which point bulk request processing work may be distributed to the server pool 290 is, for example, 60% current computational load, a first margin of 20% for example, may dictate that only serial processing be selected for current computational loads of 40% up to 60%. In such an embodiment, parallel processing may therefore be selected only when the current computational load is below the threshold by a second margin. Any margin greater than 20% below a specified threshold may therefore allow distribution of bulk transaction request workload to be distributed to the server pool 290 in a parallel manner. Using the above example, a current computational load of 0% up to 40% may therefore allow for selecting parallel processing, current computational loads of 40% up to 60% may correspond to selecting serial processing, and current computational loads in excess of 60% would delay all processing associated with bulk transaction requests. The above specified thresholds are exemplary only. Other thresholds and margins may be specified so as to enable a dynamic and flexible selection mechanism between serial and parallel processing.

In accordance with one embodiment, parallel processing includes: a) segmenting the subset of database transactions (e.g., 260 or 265) into a plurality of parts, and b) issuing the plurality of parts constituting the subset of database transactions (e.g., 260 or 265) to a plurality of server nodes 220 within the pool of server nodes 290 for processing in parallel. For example, a subset of database transactions (e.g., 260) selected for parallel processing may be broken into four parts (e.g., via load balancer 195) and then issued simultaneously to four separate server nodes within the server pool 290, such as individual server nodes 221, 222, 223, and 224, each server node 221-224 processing its respective part and transacting with the multi-tenant database system 130 in parallel. Similarly, work may be broken into work threads and assigned to redundant instances, such as virtual machines or Java Virtual Machines (JVMs) for multi-threaded parallel processing.

In accordance with one embodiment, bulk transaction request 250 is one of a plurality of requests received from a plurality of customer organizations (e.g., 105A-C). In such an embodiment, each customer organization corresponds is one of: a separate and distinct remote organization, an organizational group within the host organization (e.g., such as a division or department within a business Enterprise), a business partner of the host organization 110, or a customer organization that subscribes to cloud computing services provided by the host organization 110.

Because the host organization supports multiple tenants (e.g., customer organizations 105A-C) with the same underlying shared multi-tenant database system 130 implementation, the host organization may organize bulk transaction requests 250 in such a way that resources are allocated evenly or prevented from being consumed in an un-even manner by one or more of the multiple customer organizations. For example, one customer organization 105A-C submitting numerous bulk transaction requests 250 may inadvertently consume more than an appropriate share of computational resources of the host organization where there is contention for resources between such bulk transaction requests (e.g., multiple bulk transaction requests 250 from multiple customer organizations 105A-C are queued and awaiting processing).

Thus, in accordance with one embodiment, the host organization 110 receiving a second one or more bulk transaction requests 250 (e.g., within the file repository 165 of the host organization 110) responsively associates the bulk transaction request 250 and the second one or more additional bulk transaction requests with one of a plurality customer organizations (105A-C) based on an Organization ID (OrgID) and/or a User ID (UserID) accompanying each bulk transaction request 250. For example, such an OrgID or UserID may uniquely identify a customer organization 105A-C so that any number of received bulk transaction requests 250 from a single customer organization 105A-C, from end users of a single customer organization, or from client devices associated with a particular customer organization may appropriately be linked to the customer organization for whom work is being performed.

Thus, in accordance with one embodiment, a job session is instantiated on behalf of any customer organization 105A-C having one or more bulk transaction requests 250 received by the host organization 110. In some embodiments, a customer organization requests a job session to be instantiated and then submits bulk transaction requests 250 into the job session. In other embodiments, job session is instantiated automatically and bulk transaction requests 250 are associated with a job session based on the OrgID and/or UserID accompanying such requests. In such a way, host organization 110 may ensure evenly distributed processing opportunities for each customer organization 105A-C. Where desirable, multiple job sessions may be allowed for select customer organizations 105A-C, thus allowing preferential processing of submitted bulk transaction requests 250.

In accordance with some embodiments, all received bulk transaction requests 250 are loaded into the transaction queue 160 and retrieving a bulk transaction request 250 from the transaction queue 160 is performed on a round robin scheduling basis, selecting one bulk transaction request from among all bulk transaction requests in the transaction queue at a time. Where job sessions are utilized for grouping such request, retrieving a bulk transaction request 250 from the transaction queue 160 is performed by first selecting one of the instantiated job sessions on a round-robin basis and then retrieving a bulk transaction requests 250 associated with the selected job session (e.g., on a FIFO (first in first out) basis, on a round-robin basis, etc.).

Figure 3:
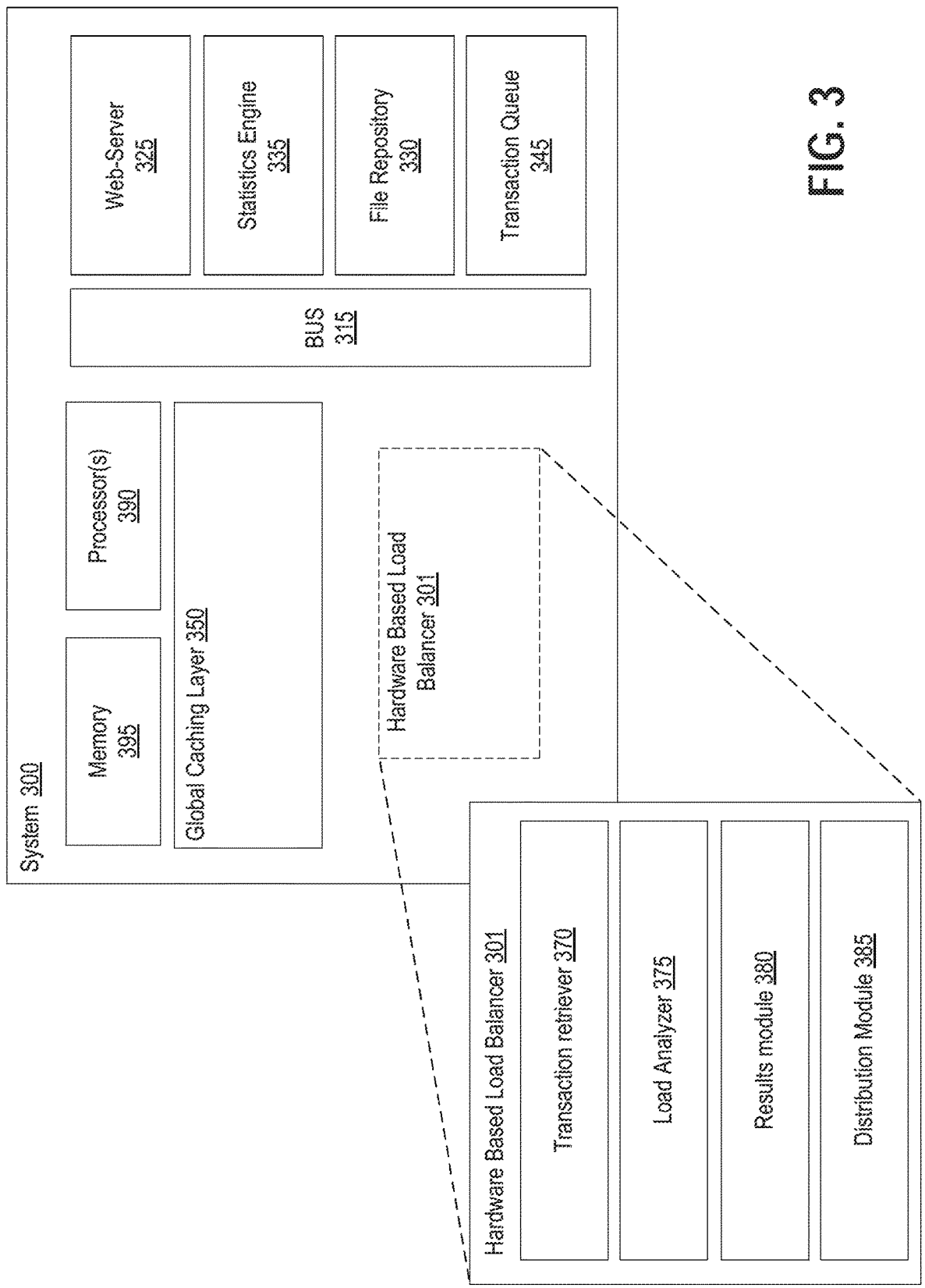
FIG. 3 shows a diagrammatic representation of a system in which embodiments may operate, be installed, integrated, or configured.

FIG. 3 shows a diagrammatic representation of a system 300 in which embodiments may operate, be installed, integrated, or configured.

In one embodiment, system 300 includes a memory 395 and a processor or processors 390. For example, memory 395 may store instructions to be executed and processor(s) 390 may execute such instructions. System 300 includes bus 315 to transfer transactions and data within system 300 among a plurality of peripheral devices communicably interfaced with bus 315. System 300 further includes web-server 325, for example, to receive requests, return responses, and otherwise interface with remote clients, such as client devices located within customer organizations 105A-C.

System 300 is further depicted as having a statistics engine 335 designed to collect, aggregate, and process operational statistics associated with a communicatively interfaced multi-tenant database system (such as that depicted at element 130 of FIG. 1) and optionally to calculate a current operational load of the multi-tenant database system. File repository 330 receives and stores bulk transaction requests submitted to system 300, such as bulk transaction requests awaiting processing. Transaction queue 345 queues a plurality of requests awaiting processing on behalf of users of the multi-tenant database system; such requests include bulk transaction requests and real-time transaction requests pending processing against the multi-tenant database system. System 300 further includes a global caching layer 350 to provide caching services to communicably interfaced devices and systems and in particular, provide caching of status information and results data (e.g., meta data, etc.).

Distinct within system 300 is hardware based load balancer 301 which includes transaction retriever 370, load analyzer 375, results module 380, and distribution module 385. In accordance with one embodiment, transaction retriever 370 retrieves database transactions for processing from the transaction queue 345 including retrieving bulk transaction requests and real-time transaction requests for processing. Load analyzer 375 retrieves calculated current computational loads (e.g., from statistics engine 335) or retrieves information necessary to calculate and determine a current computational load of the multi-tenant database system. In some embodiments, load analyzer 375 further selects a method of processing, including making a determination to schedule database transactions within a bulk transaction request in serial or parallel. Distribution module 385 operates in conjunction with load analyzer 375 to distribute work to available server nodes within a server pool based on information or directives provided by load analyzer 375. Results module 380 collects results and exit codes and updates a bulk transaction results log based on the collected information.

Figure 4:
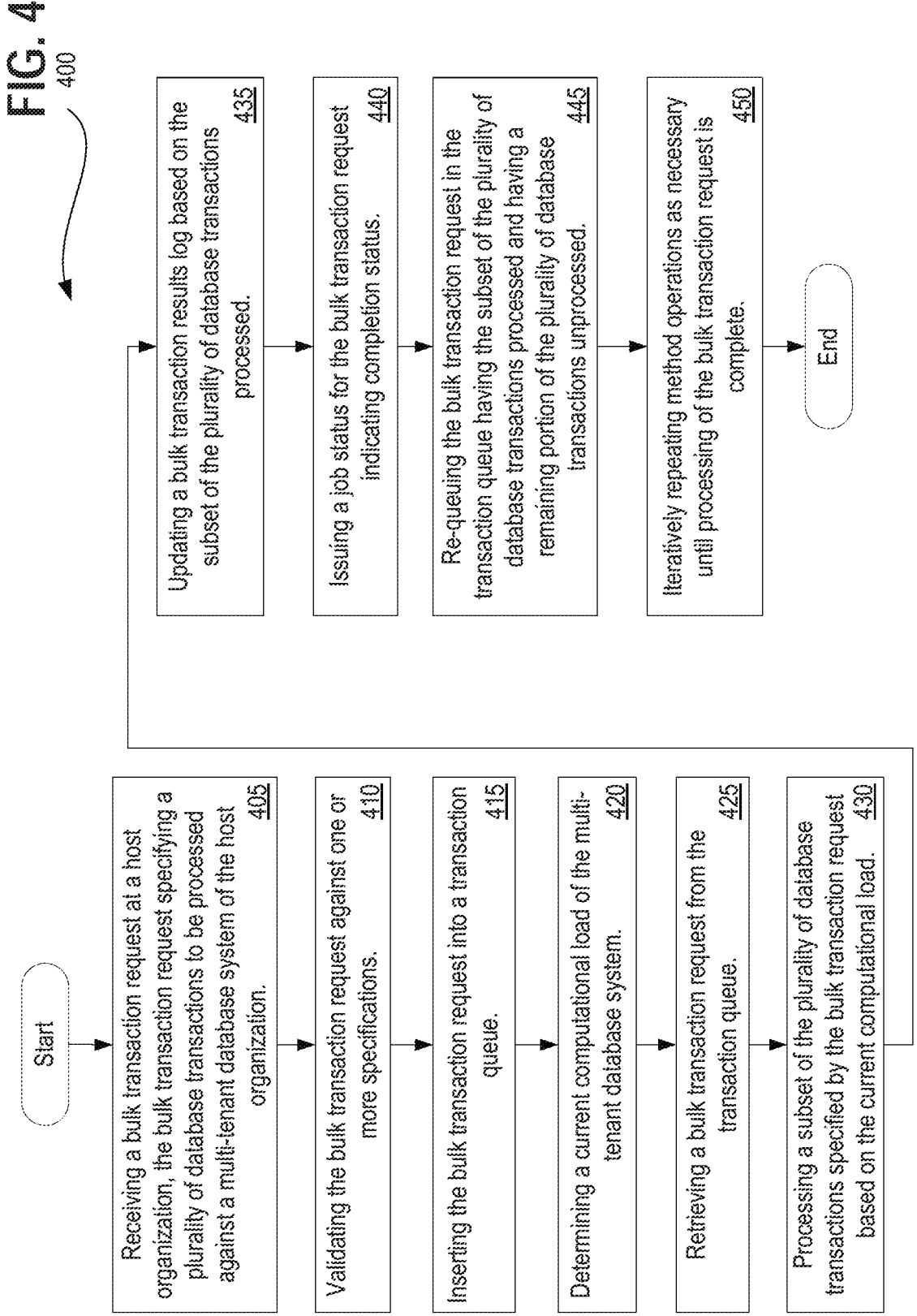
FIG. 4 is a flow diagram illustrating a method for bulk uploading of data in an on-demand service environment in accordance with one embodiment.

FIG. 4 is a flow diagram illustrating a method 400 for bulk uploading of data in an on-demand service environment in accordance with one embodiment, including receiving, managing, and processing bulk transaction requests against a multi-tenant database system based on a current computational load of such a system. Method 400 may be performed by processing logic that may include hardware (e.g., circuitry, dedicated logic, programmable logic, microcode, etc.), software (e.g., instructions run on a processing device to perform various query operations such reading, writing, updating, and searching a multi-tenant database system, or a combination thereof. In one embodiment, method 400 is performed by hardware logic, such as the hardware based load balancer depicted at element 301 of FIG. 3. Some of the blocks and/or operations listed below are optional in accordance with certain embodiments. The numbering of the blocks presented is for the sake of clarity and is not intended to prescribe an order of operations in which the various blocks must occur.

Method 400 begins with processing logic receiving a bulk transaction request at a host organization, the bulk transaction request specifying a plurality of database transactions to be processed against a multi-tenant database system of the host organization (block 405). At block 410, processing logic validates the bulk transaction request against one or more specifications and at block 415, processing logic inserts the bulk transaction request into a transaction queue.

At block 420, processing logic determines a current computational load of the multi-tenant database system. At block 425, processing logic retrieves a bulk transaction request from the transaction queue. At block 430, processing logic processes a subset of the plurality of database transactions specified by the bulk transaction request based on the current computational load. Alternatively, processing logic may delay processing of the bulk transaction request based on the current computational load.

At block 435, processing logic updates a bulk transaction results log based on the subset of the plurality of database transactions processed and at block 440, processing logic of the host organization issues a job status for the bulk transaction request indicating completion status (e.g., partially complete, percentage complete, all transactions complete, etc.).

At block 445, processing logic re-queues the bulk transaction request in the transaction queue having the subset of the plurality of database transactions processed and having a remaining portion of the plurality of database transactions unprocessed.

At block 450, processing logic iteratively repeats method operations as necessary until processing of the bulk transaction request is complete. For example, the method may re-retrieve a partially processed bulk transaction request from the transaction queue, process all of a remaining portion or part of the remaining portion based on a re-determined current computational load, etc.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant database implementations), which communicate with each other via a bus 530. Main memory 504 includes transaction queue 524 (e.g., queues and manages multiple pending requests including bulk transaction requests and real-time transaction requests pending processing against a communicatively interfaced multi-tenant database system). Also within main memory 504 is global cache layer 523 which caches data, metadata, transaction status, etc., on behalf of connected components. Main memory 504 and its sub-elements (e.g. 523 and 524) are operable in conjunction with processing logic 526 and processor 502 to perform the methodologies discussed herein. Hardware based load balancer 534 operates in conjunction with processing logic 526 and processor 502 to retrieve pending transaction requests from transaction queue 524 for processing against a connected multi-tenant database system.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.

The secondary memory 518 may include a non-transitory machine-readable storage medium (or more specifically a non-transitory machine-accessible storage medium) 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host organization having at least a processor and a memory therein, wherein the method comprises:
    receiving a bulk transaction request from a client device communicatively interfaced to the host organization at a web-server interface of the host organization executing via the processor and memory of the host organization, wherein the bulk transaction request specifies multiple database transactions to be processed against a database system of the host organization;
    determining a computational load for the database system of the host organization;
    comparing the computational load to a target threshold for distributing bulk transaction requests to a server pool for processing to calculate a margin;
    assigning, based on the margin, a processing modality and one or more servers to at least a first subset of the database transactions specified by the bulk transaction request;
    queuing the first subset of the database transactions for asynchronous processing into a transaction queue;
    partially processing the bulk transaction request by processing the first subset of the database transactions specified by the bulk transaction request;
    retaining a remainder of the database transactions not overlapping with the first subset of the database transactions as unprocessed database transactions;
    re-queuing the bulk transaction request with the transaction queue specifying only the unprocessed database transactions;
    retrieving the bulk transaction request for re-processing via:
        re-determining the computational load for the database system of the host organization,
        comparing the re-determined computational load to the target threshold for distributing bulk transaction requests to the server pool for processing to re-calculate the margin, and
        assigning, based on the re-calculated margin, a processing modality and one or more servers to at least one or more subsets of the unprocessed database transactions; and
    processing either (i) the one or more subsets of the unprocessed database transactions or (ii) an entirety of the unprocessed database transactions remaining as specified by the bulk transaction request which was re-queued with the transaction queue.

2. The method of claim 1, further comprising:
    inserting the bulk transaction request into the transaction queue among a plurality of bulk transaction requests and a plurality of real-time transaction requests already present in the transaction queue.

3. The method of claim 1, wherein:
    partially processing the bulk transaction request by processing the first the subset of the database transactions leaves a remaining portion of the database transactions corresponding to the bulk transaction request received as the unprocessed database transactions; and wherein the method further comprises:

updating a bulk transaction results log identifying the first subset of the database transactions having been processed and the remaining portion of the database transactions which remain as the unprocessed database transactions; and wherein re-queuing the bulk transaction request comprises re-queuing by specifying to the transaction queue the remaining portion of the unprocessed database transactions in the transaction queue for later processing.

4. The method of claim 1, wherein retrieving the bulk transaction request for re-processing comprises:

retrieving the bulk transaction request as re-queued with the transaction queue and specifying only the second subset of database transactions for the bulk transaction request remaining as unprocessed database transactions; and re-processing the bulk transaction request specifying the unprocessed database transactions against the database system of the host organization.

5. The method of claim 1, further comprising:

receiving a real-time transaction request at the host organization subsequent to receiving the bulk transaction request;

processing the real-time transaction request against the database system before processing any part of the bulk transaction request based on the higher priority of the real-time transaction request; and sending a response to a client device having submitted the real-time transaction request, wherein the response specifies a result for the real-time transaction request and further wherein the response indicates synchronous processing of the real-time transaction request is complete.

6. The method of claim 1:

wherein the host organization implements a cloud computing platform to provide on-demand cloud based computing services to subscribers of the cloud computing platform; and wherein end-users of the cloud computing platform are each associated with one of the plurality of customer organizations having subscriber access to the on-demand cloud based computing services provided by the cloud computing platform; and wherein receiving the bulk transaction request from the client device communicatively interfaced to the host organization comprises receiving the bulk transaction request from an end-user of the cloud computing platform on behalf of one of the customer organizations.

7. The method of claim 1, further comprising:

validating the bulk transaction request at the host organization against one or more specifications;

wherein validating the bulk transaction request comprises:

verifying the bulk transaction request complies with a maximum record count threshold, verifying the bulk transaction request complies with a maximum size threshold, verifying the bulk transaction request complies with an accepted request format; and wherein the method further comprises:

submitting the bulk transaction request to the transaction queue subject to the bulk transaction request having been successfully validated.

8. The method of claim 1, wherein re-queuing the bulk transaction request comprises:

distinguishing the first subset of the database transactions having been completed via the partial processing of the bulk transaction request from the second subset of the database transactions remaining as unprocessed database transactions for the bulk transaction request by flagging all of the database transactions for the bulk transaction request that have been processed;

removing all flagged transactions from the bulk transaction request to form an updated bulk transaction request having only those database transactions for the bulk transaction request remaining as unprocessed database transactions corresponding to the second subset; and re-queuing the updated bulk transaction request.

9. The method of claim 1, wherein each of the plurality of database transactions specified by the bulk transaction request comprises:

a transaction type selected from add, update, or delete;

a named table within the database system against which to process the respective database transaction based on the transaction type; and transaction data to be added, updated, or selected for deletion based on the transaction type during the respective database transaction.

10. The method of claim 1, further comprising:

determining a current computational load of the database system by retrieving one or more operational statistics from the database system, each operating statistic describing one of:

Input/Output utilization of the database system;

CPU utilization of the database system;

a number of free server nodes available for processing database transactions within a pool of server nodes;

a number of active threads currently processing database transactions against the database system;

a current queue time of real-time database transactions to be processed against the database system; and a number of queued real-time database transactions to be processed against the database system.

11. The method of claim 10, wherein re-processing the bulk transaction request re-queued is based on re-determining the current computational load after determining that the bulk transaction request was only partially processed and has unprocessed database transactions remaining.

12. The method of claim 10:

wherein processing the first subset of the plurality of database transactions specified by the bulk transaction request includes sending, via a queue handler, the first subset of the plurality of the database transactions specified by the bulk transaction request to a load balancer for process routing based on the determined current computational load of the database system; and wherein the queue handler returns one or more of: (i) a reference pointer to, and (ii) a requested number of, the plurality of database transactions specified by the bulk transaction request.

13. The method of claim 12, wherein the load balancer sends the first subset of the plurality of database transactions specified by the bulk transaction request to one or more server nodes for processing based on the current computational load of the database system.

14. The method of claim 12, wherein the load balancer directs the one or more server nodes to return a response, wherein the response indicates which of the first subset of the plurality of database transactions specified by the bulk transaction request have been processed and which remain as unprocessed.

15. The method of claim 12, wherein the load balancer allocates a pre-determined number of the first subset of the plurality of database transactions specified by the bulk transaction request for processing.

16. The method of claim 1, wherein partially processing the bulk transaction request by processing a first subset of the database transactions specified by the bulk transaction request occurs when the current computational load is below a threshold, wherein the plurality of real-time transaction requests are assigned a higher priority than the plurality of bulk transaction requests and are selected for processing against the database system based on the higher priority and further wherein the plurality of bulk transaction requests are assigned a lower priority than the plurality of real-time transaction requests and are selected for processing against the database system based on the lower priority and based further on the determined current computational load of the database system.

17. The method of claim 1, wherein re-queuing the bulk transaction request comprises:
distinguishing the first subset of the database transactions having been completed via the partial processing of the bulk transaction request from the second subset of the database transactions remaining as unprocessed database transactions for the bulk transaction request by flagging all of the database transactions for the bulk transaction request that have been processed;
removing all flagged transactions from the bulk transaction request to form an updated bulk transaction request having only those database transactions for the bulk transaction request remaining as unprocessed database transactions corresponding to the second subset; and
re-queuing the updated bulk transaction request.

18. The method of claim 1, wherein re-queuing the bulk transaction request comprises:
determining those database transactions for the bulk transaction request remaining as unprocessed database transactions corresponding to the second subset and re-queuing the bulk transaction request with only the second subset of database transactions which remain as unprocessed database transactions; or alternatively
removing the processed transactions corresponding to the first subset from the bulk transaction request and re-queuing the bulk transaction request specifying only the second subset of database transactions which remain as unprocessed database transactions.

19. Non-transitory computer readable storage media having instructions stored thereupon that, when executed by a host organization having at least a processor and a memory therein, the instructions cause the processor to perform operations comprising:
receiving a bulk transaction request from a client device communicatively interfaced to the host organization at a web-server interface of the host organization executing via the processor and memory of the host organization, wherein the bulk transaction request specifies multiple database transactions to be processed against a database system of the host organization;
determining a computational load for the database system of the host organization;
comparing the computational load to a target threshold for distributing bulk transaction requests to a server pool for processing to calculate a margin;
assigning, based on the margin, a processing modality and one or more servers to at least a first subset of the database transactions specified by the bulk transaction request;
queuing the first subset of the database transactions for asynchronous processing into a transaction queue;
partially processing the bulk transaction request by processing the first subset of the plurality of database transactions specified by the bulk transaction request;
retaining a remainder of the database transactions not overlapping with the first subset of the database transactions as unprocessed database transactions;
re-queuing the bulk transaction request with the transaction queue specifying only the unprocessed database transactions;
retrieving the bulk transaction request for re-processing via:
re-determining the computational load for the database system of the host organization;
comparing the re-determined computational load to the target threshold for distributing bulk transaction requests to the server pool for processing to re-calculate the margin, and
assigning, based on the re-calculated margin, a processing modality and one or more servers to at least one or more subsets of the unprocessed database transactions; and
processing either (i) the one or more subsets of the unprocessed database transactions or (ii) an entirety of the unprocessed database transactions remaining as specified by the bulk transaction request which was re-queued with the transaction queue.

20. A system to execute at a host organization, wherein the system comprises:
a memory to store instructions;
a set of one or more processors;
a non-transitory machine-readable storage medium that provides instructions that, when executed by the set of one or more processors, the instructions stored in the memory are configurable to cause the system to perform operations comprising:
receiving a bulk transaction request from a client device communicatively interfaced to the host organization at a web-server interface of the host organization executing via the processor and memory of the host organization, wherein the bulk transaction request specifies multiple database transactions to be processed against a database system of the host organization;
determining a computational load for the database system of the host organization;
comparing the computational load to a target threshold for distributing bulk transaction requests to a server pool for processing to calculate a margin;
assigning, based on the margin, a processing modality and one or more servers to at least a first subset of the database transactions specified by the bulk transaction request;
queuing the first subset of the database transactions for asynchronous processing into a transaction queue;
partially processing the bulk transaction request by processing the first subset of the database transactions specified by the bulk transaction request;
retaining a remainder of the database transactions not overlapping with the first subset of the database transactions as unprocessed database transactions;

re-queuing the bulk transaction request with the transaction queue specifying only the unprocessed database transactions;

retrieving the bulk transaction request for re-processing via:
- re-determining the computational load for the database system of the host organization;
- comparing the re-determined computational load to the target threshold for distributing bulk transaction requests to the server pool for processing to re-calculate the margin, and
- assigning, based on the re-calculated margin, a processing modality and one or more servers to at least one or more subsets of the unprocessed database transactions; and processing either (i) the one or more subsets of the unprocessed database transactions or (ii) an entirety of the unprocessed database transactions remaining as specified by the bulk transaction request which was re-queued with the transaction queue.

21. The method of claim 1, wherein assigning a processing modality includes assigning:
(i) serial processing, (ii) parallel processing, (iii) multi-threaded parallel processing of work threads by redundant instances threads, and (iv) delayed processing when the computation load exceeds the target threshold.

\* \* \* \* \*